United States Patent
Khanna et al.

(10) Patent No.: US 9,123,345 B2
(45) Date of Patent: Sep. 1, 2015

(54) VOICE INTERFACE SYSTEMS AND METHODS

(71) Applicant: Honda Motor Co., Ltd., Minato-ku, Tokyo (JP)

(72) Inventors: Rahul Khanna, Plantation, FL (US); Tatsuya Kyomitsu, Oyama (JP); Xin Guan, Milpitas, CA (US)

(73) Assignee: Honda Motor Co., Ltd., Tokyo (JP)

( * ) Notice: Subject to any disclaimer, the term of this patent is extended or adjusted under 35 U.S.C. 154(b) by 259 days.

(21) Appl. No.: 13/802,910

(22) Filed: Mar. 14, 2013

(65) Prior Publication Data

US 2014/0278436 A1    Sep. 18, 2014

(51) Int. Cl.
*G10L 21/00* (2013.01)
*G10L 15/22* (2006.01)
*G10L 15/26* (2006.01)
*G10L 15/18* (2013.01)

(52) U.S. Cl.
CPC .............. *G10L 21/00* (2013.01); *G10L 15/22* (2013.01); *G10L 15/1822* (2013.01); *G10L 15/26* (2013.01); *G10L 15/265* (2013.01); *G10L 2015/223* (2013.01)

(58) Field of Classification Search
CPC ....... G10L 15/22; G10L 15/265; G10L 17/26; G10L 13/043; G10L 15/30; G10L 13/00; G06F 17/30746; G06F 3/16; H04M 2201/40; H04M 2201/60; H04M 3/4938; H04L 12/5895; H04L 51/38; H04L 63/26; H04W 4/18; H04W 4/14; H04W 12/10; G07C 5/008

USPC .......... 704/270, 270.1, 275, 235, 9; 455/411, 455/563, 567
See application file for complete search history.

(56) References Cited

U.S. PATENT DOCUMENTS

| 6,385,535 | B2 | 5/2002 | Ohishi et al. |
| 6,529,826 | B2 | 3/2003 | Kawai et al. |
| 6,731,625 | B1* | 5/2004 | Eastep et al. ............... 370/352 |
| 6,850,252 | B1* | 2/2005 | Hoffberg ............... 715/716 |
| 6,909,708 | B1* | 6/2005 | Krishnaswamy et al. ..... 370/352 |
| 7,289,904 | B2 | 10/2007 | Uyeki |

(Continued)

FOREIGN PATENT DOCUMENTS

| JP | 2003-6223 A | 1/2003 |
| JP | 2003-115929 A | 4/2003 |

(Continued)

OTHER PUBLICATIONS

Müller, Norbert; Office Action issued in German Patent Application No. 10 2014 204 108.2; dated Nov. 4, 2014; 2 pages.

(Continued)

*Primary Examiner* — Vijay B Chawan
(74) *Attorney, Agent, or Firm* — Ulmer & Berne LLP

(57) ABSTRACT

A voice-controlled system is described that can be accessed by a mobile computing device. A user can communicate requests using natural language utterances. A microphone can collect the utterances and provide them to the mobile computing device. The mobile computing device can transmit the human utterance to a voice interface system. The voice interface system can utilize user preferences when executing the request to provide a personalized user experience. Computer-implemented methods are also described herein.

20 Claims, 4 Drawing Sheets

(56) References Cited

U.S. PATENT DOCUMENTS

| | | | |
|---|---|---|---|
| 7,693,720 B2 | 4/2010 | Kennewick et al. | |
| 8,131,718 B2* | 3/2012 | Tran | 707/732 |
| 8,140,335 B2 | 3/2012 | Kennewick et al. | |
| 2002/0064149 A1* | 5/2002 | Elliott et al. | 370/352 |
| 2006/0200259 A1* | 9/2006 | Hoffberg et al. | 700/86 |
| 2009/0047929 A1* | 2/2009 | Chesnutt et al. | 455/411 |
| 2010/0145700 A1 | 6/2010 | Kennewick et al. | |
| 2010/0250243 A1 | 9/2010 | Schalk et al. | |
| 2010/0332231 A1 | 12/2010 | Nakano et al. | |
| 2012/0016678 A1* | 1/2012 | Gruber et al. | 704/275 |
| 2012/0028617 A1* | 2/2012 | Madhavan et al. | 455/414.1 |
| 2012/0029758 A1* | 2/2012 | Proefke et al. | 701/29 |
| 2012/0035923 A1* | 2/2012 | Krause | 704/235 |
| 2012/0069131 A1* | 3/2012 | Abelow | 348/14.01 |
| 2012/0101810 A1 | 4/2012 | Kennewick et al. | |
| 2012/0143863 A1* | 6/2012 | Tran | 707/732 |
| 2012/0149356 A1* | 6/2012 | Arun et al. | 455/419 |
| 2012/0191291 A1* | 7/2012 | Krause et al. | 701/29.6 |
| 2012/0253823 A1 | 10/2012 | Schalk et al. | |
| 2012/0265528 A1 | 10/2012 | Gruber et al. | |
| 2013/0110505 A1* | 5/2013 | Gruber et al. | 704/9 |

FOREIGN PATENT DOCUMENTS

| | | |
|---|---|---|
| JP | 2003-533909 A | 11/2003 |
| JP | 2006-195637 A | 7/2006 |
| WO | 0171480 A2 | 9/2001 |
| WO | 0171480 A3 | 4/2003 |
| WO | 2010092662 A1 | 8/2010 |

OTHER PUBLICATIONS

Müller, Norbert; Office Action issued in German Patent Application Serial No. 10 2014 204 108.2 on Jun. 25, 2014, in its entirety.

Müller, Norbert; Search Report issued in German Patent Application Serial No. 10 2014 204 108.2 on Jun. 25, 2014, in its entirety.

Office Action issued in related Japanese Patent Application No. 2014-024192, dated Feb. 10, 2015; 8 pages, including partial English translation.

* cited by examiner

VOICE INTERFACE SYSTEMS AND METHODS

TECHNICAL FIELD

The systems and methods described below relate generally to the field of speech recognition, and, more specifically, to vehicle-based voice interface systems and methods.

BACKGROUND

As mobile computing devices, such as smart phones, tablets, and the like, become increasingly ubiquitous and their functionality increases, users often operate such personal devices while in a vehicle. These mobile computing devices often remain connected to a data network over wireless air interfaces. Some vehicles with a graphical user interface provide a data connection between a passenger's mobile computing device and the graphical user interface, thereby allowing information received over the cellular network wireless air interface to be provided to the vehicle's graphical user interface.

SUMMARY

In accordance with one embodiment, a voice-controlled system is provided. The voice-controlled system comprises a user preference database configured to store user preference data and a voice interface computing system in communication with the user preference database. The voice interface computing system is configured to receive audio data from a mobile computing device via a wireless communications network, wherein the audio data comprises a human utterance. The voice interface computing system is also configured to transmit the audio data to a speech recognition module, receive text data from the speech recognition module, transmit the text data to a natural language processing module, and receive a command set from the natural language processing module. The voice interface computing system is further configured to execute a command based on the command set and the user preference data stored in the user preference database, wherein executing the command comprises communicating with a remote application and communicating with the mobile computing device via the wireless communications network.

In accordance with another embodiment, a method is provided that comprises receiving, by a computing system, user preference data, receiving, by the computing system from a mobile computing device, audio data, wherein the audio data comprises a human utterance; and transmitting, by the computing system, the audio data to a speech recognition module to obtain text data associated with the audio data. The method also comprises transmitting, by the computing system, the text data to a natural language processing unit; receiving, by the computing system, a command set from the natural language processing unit; and executing a command based on the command set and the user preference data.

In accordance with yet another embodiment, a system is provided that comprises a user preference database configured to store user preference data and a voice interface computing system in communication with the user preference database. The voice interface computing system is configured to receive audio data from a mobile computing device connected to an onboard vehicle network, wherein the audio data comprises a natural language human utterance of a passenger of the vehicle. The voice interface computing system is also configured to communicate with a natural language processing module that is configured to transmit a command set to the voice interface computing system based on the intention of the human utterance, execute a command based on the command set and the user preference data stored in the user preference database, and cause the display of information to the passenger of the vehicle via the mobile computing device.

BRIEF DESCRIPTION OF THE DRAWINGS

Various embodiments will become better understood with regard to the following description, appended claims, and accompanying drawings wherein:

DETAILED DESCRIPTION

Figure 1:
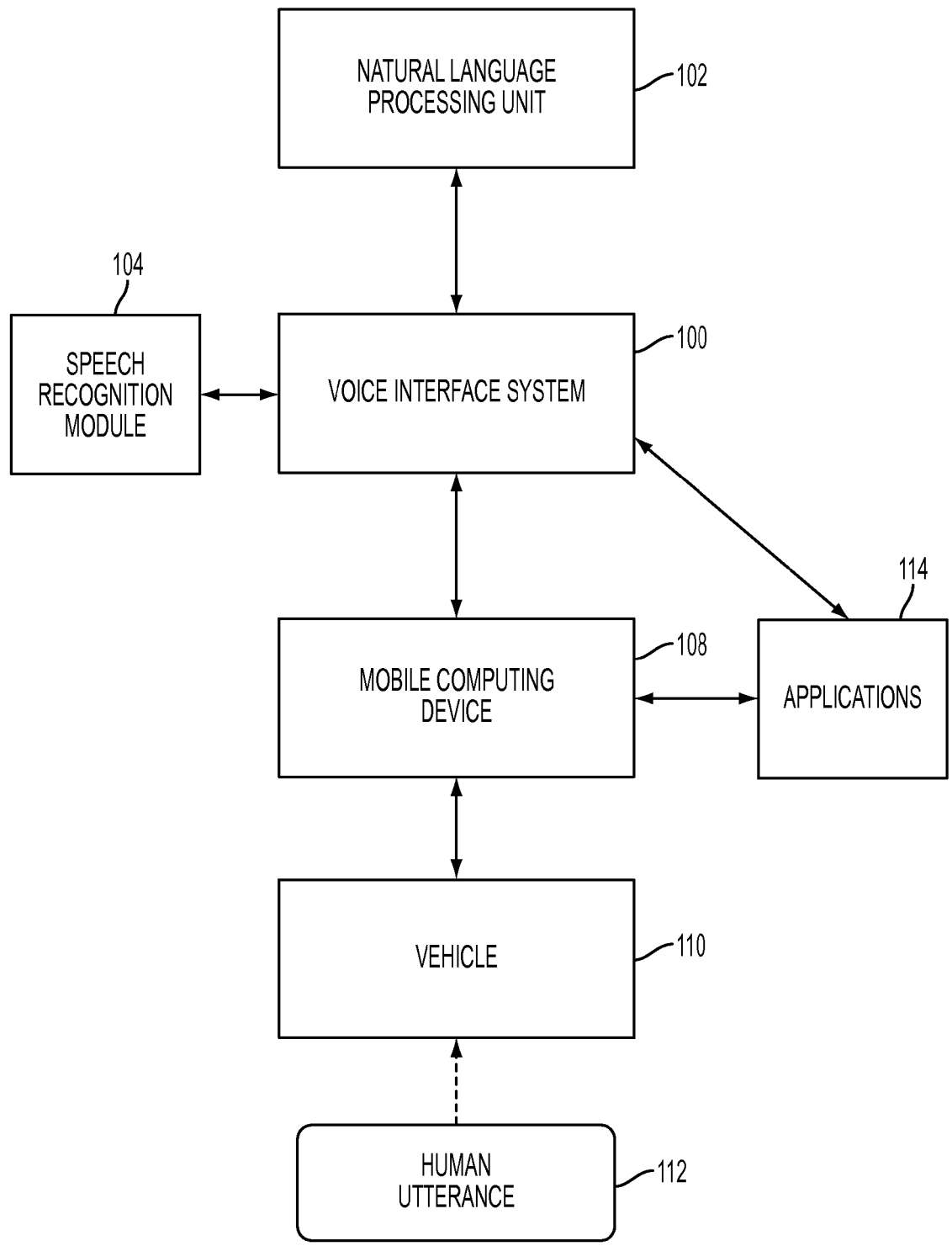
FIG. 1 depicts an example simplified block diagram of a voice-controlled system.

Various non-limiting embodiments of the present disclosure will now be described to provide an overall understanding of the principles of the structure, function, and use of the voice interface systems and methods disclosed herein. One or more examples of these non-limiting embodiments are illustrated in the accompanying drawings. Those of ordinary skill in the art will understand that systems and methods specifically described herein and illustrated in the accompanying drawings are non-limiting embodiments. The features illustrated or described in connection with one non-limiting embodiment may be combined with the features of other non-limiting embodiments. Such modifications and variations are intended to be included within the scope of the present disclosure.

Reference throughout the specification to "various embodiments," "some embodiments," "one embodiment," "some example embodiments," "one example embodiment," or "an embodiment" means that a particular feature, structure, or characteristic described in connection with any embodiment is included in at least one embodiment. Thus, appearances of the phrases "in various embodiments," "in some embodiments," "in one embodiment," "some example embodiments," "one example embodiment, or "in an embodiment" in places throughout the specification are not necessarily all referring to the same embodiment. Furthermore, the particular features, structures, or characteristics may be combined in any suitable manner in one or more embodiments.

Throughout this disclosure, references to components or modules generally refer to items that logically can be grouped together to perform a function or group of related functions. Like reference numerals (such as 108, 208, 308, for example) are generally intended to refer to the same or similar components. Components and modules can be implemented in software, hardware, or a combination of software and hardware. The term software is used expansively to include not only executable code, but also data structures, data stores, and computing instructions in any electronic format, firmware, and embedded software. The terms information and data are used expansively and can include a wide variety of electronic information, including but not limited to machine-executable or machine-interpretable instructions; content such as text, video data, and audio data, among others; and various codes or flags. The terms information, data, and content are sometimes used interchangeably when permitted by context.

The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. Any failure to specifically describe a combination or sub-combination of components should not be understood as an indication that any combination or sub-combination is not possible. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Vehicles can include one or more graphical user interfaces to present various types of information to an occupant of a passenger compartment. Example information can include navigational information, on-board entertainment information, vehicle diagnostic information, and information received through a wireless connection to the Internet or other type of network. Some vehicles allow for a mobile computing device, such as smart phone, a tablet computer, and the like, to be connected to an onboard vehicle network, such as through Universal Serial Bus (USB), Wi-Fi, BLUETOOTH®, ZIG-BEE, one of the IEEE 802.11x family of network protocols, or any another suitable wireless or wired network protocol. By way of this connection, information received by the mobile computing device can be provided to the graphical user interface of the vehicle, such that it can be viewed by an occupant of a passenger compartment or otherwise utilized by the vehicle. In some embodiments, a mobile computing device in communication with a vehicle can also execute a software application, sometimes referred to as an "app," that communicates with a remote server through a suitable wireless communications protocol. Accordingly, information received from a remote server during execution of the application on a mobile computing device can be relayed to a graphical user interface of a vehicle or otherwise provided to the vehicle.

The systems and methods described herein generally provide techniques for allowing an occupant of a vehicle to interact with the graphical user interface of the vehicle through natural language voice commands. In some embodiments, off-board (e.g., cloud-based), real-time speech recognition is utilized to interpret natural language commands of an occupant of a vehicle and, in turn, execute the commands in accordance with preferences of the occupant. As a result, an occupant of a vehicle can be provided with personalized or tailored functionality that is based on natural language communications with a remote speech recognition system.

FIG. 1 depicts an example simplified block diagram of a voice-controlled system. A mobile computing device 108 is shown in communication with a vehicle 110 via an onboard vehicle network (such as onboard vehicle network 454 shown in FIG. 4). The mobile computing device 108 can be any suitable device capable of network communications, such as a smart phone, a tablet computer, a gaming system, a laptop computer, and the like. As described in more detail below, the mobile computing device 108 can be in communication with the vehicle 110 through any suitable type of data connection using any suitable communications protocol. In some embodiments, for example, the mobile computing device 108 communicates with the vehicle 110 through a wired connection, while in other embodiments, the mobile computing device 108 communicates with the vehicle 110 through a wireless connection. In any event, the mobile computing device 108 can also be in communication with a voice interface system 100. In some embodiments, the voice interface system 100 is accessed via web-based communications, such as by commands generated by a web browser application on the mobile computing device 108. In some embodiments, the voice interface system 100 is accessed via a specialized application that is installed and executed on the mobile computing device 108.

The vehicle 110 can include a microphone, or other type of audio transducer, capable of receiving a human utterance 112 spoken by the driver or passenger(s) of the vehicle, any of whom are generally referred to herein as a "user." The human utterance 112 can, in turn, be provided to the mobile computing device 108 by way of the onboard vehicle network in the form of an electronic audio file. In some embodiments, audio received by the vehicle 110 is compressed utilizing a lossy codec, or other data compression techniques, prior to providing the data to the mobile computing device 108. As is to be appreciated, compressing the audio file can reduce latency, among other benefits.

The human utterance 112 provided by the user can be in a natural language format, such that a user is not necessarily required to utter a particular command or phrase to perform a desired function. Moreover, the human utterance 112 can relate to a wide variety of topics or commands. For example, the human utterance 112 can be a destination-based request, such as "I am hungry" or "where is the closest Italian restaurant". The human utterance 112 can also be a destination and weather-related request, such as "What will the weather be like at my meeting tomorrow?" The human utterance 112 can even relate to a social-network website or other type of third party application, such as "show me some recent status updates." The human utterance 112 can also relate to in-vehicle entertainment, such as "play my favorite songs" or "who sings this song?" As is to be appreciated, a large number of other types of human utterances 112 can be provided to the vehicle 110 without departing from the scope of the present disclosure.

Still referring to FIG. 1, upon receiving the human utterance 112, the mobile computing device 108 can relay the audio data to the voice interface system 100. The audio data can be relayed over any suitable wireless air interface, such as a cellular network or a WIFI network, for example. Upon receiving the audio data from the mobile computing device 108, the voice interface system 100 can generally determine the intent of the user and then execute one or commands based on the intent of the user, and, if available, the personal preferences of the user. To perform various aspects of this processing, the voice interface system 100 can communicate with a variety of modules, some of which can be remote from the voice interface system 100 and accessible via application programming interfaces (APIs), for example.

In the illustrated embodiment, the voice interface system 100 communicates with a speech recognition module 104, which generally functions to convert the audio data to text data. The speech recognition module 104 can utilize conventional speech-to-text processing algorithms to convert the human utterance 112 into a text-based format. Once the text data has been received by the voice interface system 100 from the speech recognition module 104, the text data can be provided to a natural language processing unit 102 for further processing. The natural language processing unit 102 can be configured to determine an intention of the human utterance 112 utilizing natural language understanding (NLU) algorithms and techniques. In some embodiments, the natural language processing unit 102 utilizes processing techniques described in U.S. Patent Application Publication No. 2010/0332231, entitled "Lexical Acquisition Apparatus, Multi Dialogue Behavior System, and Lexical Acquisition Program," which is incorporated herein by reference in its entirety.

Still referring to FIG. 1, the natural language processing unit 102 can, based on the intention of the human utterance 112, determine a command set which would generally fulfill the requests of the user. This command set can then be provided to the voice interface system 100 for execution. In some embodiments, execution of commands in the command set can utilize various user preferences or personal data stored by, or otherwise accessible to, the voice interface system 100 to personalize the experience of the user. As described in more detail below, user preferences can include, without limitation, dining preferences, navigation preferences, appointment data, historical data, radio station preferences, entertainment preferences, climate control preferences, temperature setting preferences, seat position preferences, and so forth. In some instances, execution of a command in the command set can require communication with one or more applications 114, such as a social networking application, a web search application, a calendar application, a GPS application, or any other suitable type of application, website, or network-accessible data.

Based on the communications with the associated applications 114, data or information relevant to the human utterance 112 can be provided to the mobile computing device 108, either from one of the applications 114 or by way of the voice interface system 100. In any event, once the data or information has been received by the mobile computing device 108, it can subsequently be transmitted to the vehicle 110 using the onboard vehicle network. The vehicle 110 can then display the information on a graphical user display or otherwise utilize the information.

As is to be appreciated, various components of the voice-controlled system illustrated in FIG. 1 can be grouped together. For example, in some embodiments, the speech recognition module 104 and/or the natural language processing unit 102 can be a component of the voice interface system 100. Moreover, in some embodiments, the speech recognition module 104 and the natural language processing unit 102 can be combined and function as a single component.

Figure 2:
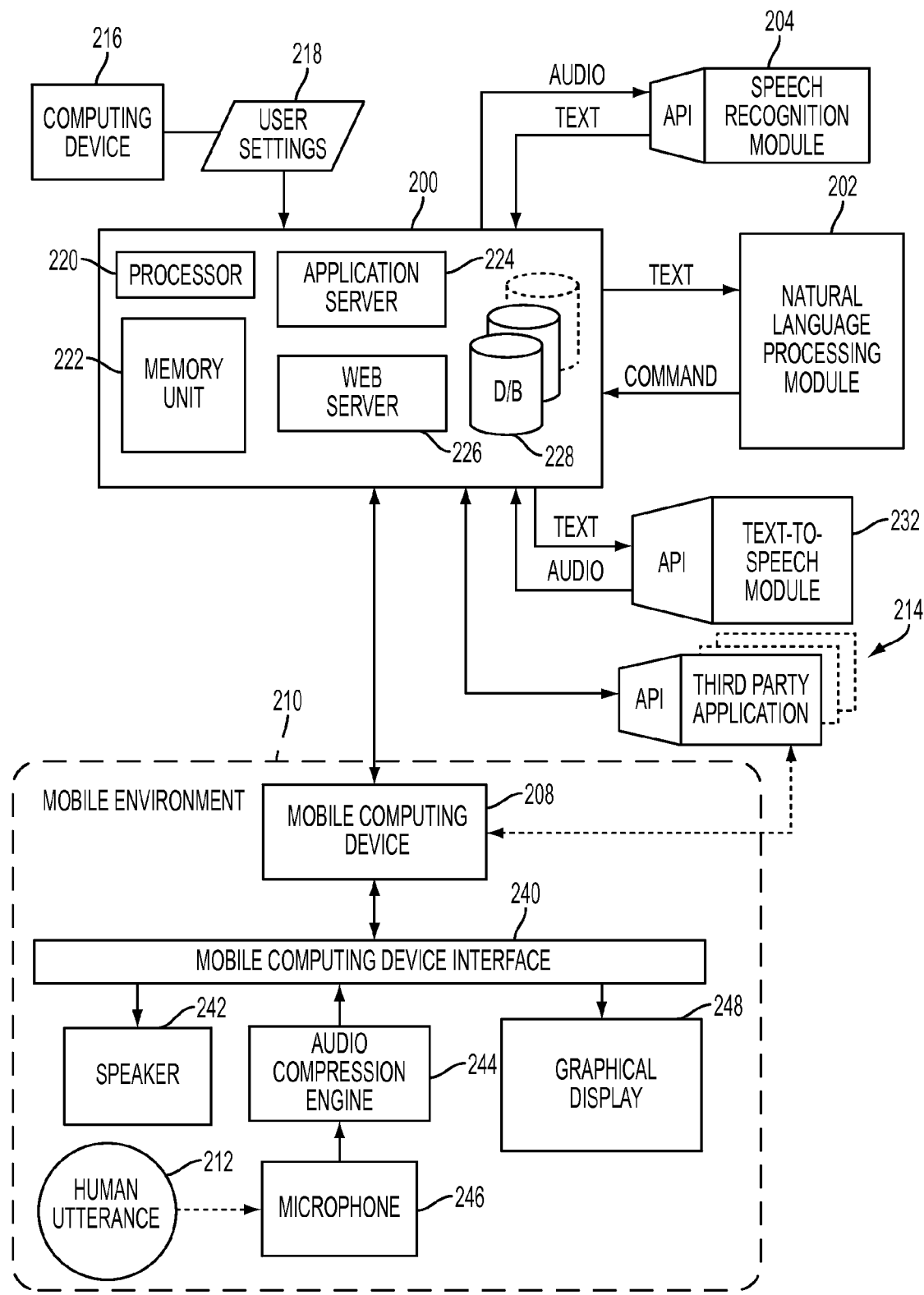
FIG. 2 depicts an example block diagram of another voice-controlled system.

FIG. 2 depicts an example block diagram of another voice-controlled system. The voice-controlled system comprises a voice interface system 200 that receives and processes audio content from a mobile computing device 208. The voice interface system 200 can be provided using any suitable processor-based device or system, such as a personal computer, laptop, server, mainframe, or a collection (e.g., network) of multiple computers, for example. The voice interface system 200 can include one or more processors (e.g., 220) and one or more computer memory units (e.g., 222). For convenience, only one processor 220 and only one memory unit 222 are shown in FIG. 2. The processor 220 can execute software instructions stored on the memory unit 222. The processor 220 can be implemented as an integrated circuit (IC) having one or multiple cores. The memory unit 222 can include volatile and/or non-volatile memory units. Volatile memory units can include random access memory (RAM), for example. Non-volatile memory units can include read only memory (ROM), for example, as well as mechanical non-volatile memory systems, such as, for example, a hard disk drive, an optical disk drive, etc. The RAM and/or ROM memory units can be implemented as discrete memory ICs, for example.

The memory unit 222 can store executable software and data, such that when the processor 220 of the voice interface system 200 executes the software, the processor 220 can be caused to perform the various operations of the voice interface system 200, such as receive information from computer devices, process commands received from computer devices, and store and retrieve information in user databases, as discussed in more detail below. Data used by the voice interface system 200 can be from various sources, such as from database 228, or other types of electronic data store. The database 228 can include a user preference database, for example. The data stored in the database 228 can be stored in a non-volatile computer memory, such as a hard disk drive, a read only memory (e.g., a ROM IC), or other types of non-volatile memory. Also, the data associated with the database 228 can be stored on a remote electronic computer system, for example.

User preference data, illustrated as user settings 218, can be received by the voice interface system 200 from a user interacting with a computing device 216. In some embodiments, the user settings 218 are received through a web portal presented to the user via the computing device 216. In some embodiments, a specialized application can be executed on the computing device 216 which allows a user to provide user settings to the voice interface system 200. In some embodiments, the computing device 216 is the mobile computing device 208, although this disclosure is not so limited. A user can generally use any suitable computing device 216 to interact with the voice interface system 200 so that the user's preferences can be stored so that a personalized voice interaction experience can be provided to the user, as described in more detail below. The types of data included in the user settings 218 can vary, but examples include favorite restaurants, preferred driving routes, calendar appointments, contact addresses, social network information, entertainment related information, and so forth. User settings 218 can also include, for example, graphical display preferences, such as the ordering of particular icons that are displayed on the mobile computing device 208 when a specialized application associated with the voice interface system 200 is executed.

As shown in FIG. 2, the voice interface system 200 can include several computer servers. For example, the voice interface system 200 can include one or more web servers (e.g., 226) and application servers (e.g., 224). For convenience, only one web server 226 and one application server 224 are shown in FIG. 2, although it should be recognized that this disclosure is not so limited. The web server 226 can provide a graphical web user interface through which users of the system can interact with the voice interface system 200. The web server 226 can accept requests, such as HTTP requests, from clients (such as web browsers on the mobile computing device 208), and serve the clients responses, such as HTTP responses, along with optional data content, such as web pages (e.g., HTML documents) and linked objects (such as images, etc.).

The application server 224 can provide a user interface for users who do not communicate with the voice interface system 200 using a web browser. Such users can have special software installed on their mobile computing device 208 that allows them to communicate with the application server 224 via a communications network. Such software can be downloaded, for example, from the voice interface system 200, or other software application provider (i.e., the Apple™ iStore™), such as over the network to such mobile computing device 208.

Although FIG. 2 depicts a limited number of elements for purposes of illustration, it can be appreciated that the voice interface system 200 can include more or less elements as well as other types of elements in accordance with the described embodiments. Elements of the voice interface system 200 can include physical or logical entities for communicating information implemented as hardware components (e.g., computing devices, processors, logic devices), executable computer program instructions (e.g., firmware, software) to be executed by various hardware components, or a combination thereof, as desired for a given set of design parameters or performance constraints.

As described in more detail below, the voice interface system 200 can also be in communication (or in some cases include) with other modules, such as a speech recognition (SR) module 204, a natural language processing module 202, and/or a text-to-speech (TTS) module 232. The voice interface system 200 can also communicate with a variety of other computer-based systems, generally illustrated as third party applications 214. Example third party applications 214 include FACEBOOK®, GOOGLE®, LINKEDIN®, PANDORA®, IHEARTRADIO®, TWITTER®, and the like. The voice interface system 200 can communicate with the various modules and applications using any suitable types of communications, such as using API protocols, for example.

The voice interface system 200 can be in communication with the mobile computing device 208 via an electronic communications network (not shown). The communications network can include a number of computer and/or data networks, including the Internet, LANs, WANs, GPRS networks, etc., and can comprise wired and/or wireless communication links. The mobile computing device 208 that communicates with the voice interface system 200 can be any type of client device suitable for wireless communication over the network, such as a personal computer, a laptop computer, smartphone, personal digital assistant (PDA), combination mobile telephone/PDA, gaming device, messaging device, media player, pager, tablet computer, or a netbook computer, for example.

Some mobile computing devices 208 also can support wireless wide area network (WWAN) data communications services including Internet access. Examples of WWAN data communications services can include Evolution-Data Optimized or Evolution-Data only (EV-DO), Evolution For Data and Voice (EV-DV), CDMA/1xRTT, GSM with General Packet Radio Service systems (GSM/GPRS), Enhanced Data Rates for Global Evolution (EDGE), High Speed Downlink Packet Access (HSDPA), High Speed Uplink Packet Access (HSUPA), and others. The mobile computing devices 208 can provide wireless local area network (WLAN) data communications functionality in accordance with the Institute of Electrical and Electronics Engineers (IEEE) 802.xx series of protocols, such as the IEEE 802.11a/b/g/n series of standard protocols and variants (also referred to as "Wi-Fi"), the IEEE 802.16 series of standard protocols and variants (also referred to as "WiMAX"), the IEEE 802.20 series of standard protocols and variants, and others.

In some example embodiments, the mobile computing device 208 also can be arranged to perform data communications functionality in accordance with shorter range wireless networks, such as a wireless personal area network (PAN) offering BLUETOOTH® data communications services in accordance with the BLUETOOTH® Special Interest Group (SIG) series of protocols, specifications, profiles, and so forth. Other examples of shorter range wireless networks can employ infrared (IR) techniques or near-field communication techniques and protocols, such as electromagnetic induction (EMI) techniques including passive or active radio-frequency identification (RFID) protocols and devices. The mobile computing device 208 can also be configured to perform data communication functionality utilizing a wired connection, such as a Universal Serial Bus (USB) connection, for example.

The mobile computing device 208 can comprise various radio elements, including a radio processor, one or more transceivers, amplifiers, filters, switches, and so forth to provide voice and/or data communication functionality. It may be appreciated that the mobile computing device 208 can operate in accordance with different types of wireless network systems utilizing different radio elements to implement different communication techniques. The mobile computing device 208 also can comprise various input/output (I/O) interfaces for supporting different types of connections such as a serial connection port, an IR port, a Bluetooth® interface, a network interface, a Wi-Fi interface, a WiMax interface, a cellular network interface, a wireless network interface card (WNIC), a transceiver, and so forth. The mobile computing device 208 can comprise one or more internal and/or external antennas to support operation in multiple frequency bands or sub-bands such as the 2.4 GHz range of the ISM frequency band for Wi-Fi and BLUETOOTH® communications; one or more of the 850 MHz, 900 MHZ, 1800 MHz, and 1900 MHz frequency bands for GSM, CDMA, TDMA, NAMPS, cellular, and/or PCS communications; the 2100 MHz frequency band for CDMA2000/EV-DO and/or WCDMA/JMTS communications; the 1575 MHz frequency band for Global Positioning System (GPS) operations, and others.

The mobile computing device 208 can provide a variety of applications for allowing a user to accomplish one or more specific tasks using the voice interface system 200. Applications can include, without limitation, a web browser application (e.g., INTERNET EXPLORER® MOZILLA®, FIREFOX®, SAFARI®, OPERA®, NETSCAPE NAVIGATOR®), telephone application (e.g., cellular, VoIP, PTT), networking application, messaging application (e.g., e-mail, IM, SMS, MMS, BLACKBERRY® Messenger), contacts application, calendar application, and so forth. The mobile computing device 208 can comprise various software programs such as system programs and applications to provide computing capabilities in accordance with the described embodiments. System programs can include, without limitation, an operating system (OS), device drivers, programming tools, utility programs, software libraries, application programming interfaces (APIs), and so forth. Exemplary operating systems can include, for example, a PALM® OS, MICROSOFT® OS, APPLE® OS, CHROME® OS, and others.

The mobile computing device 208 can include various components for interacting with the application such as a display for presenting the user interface and a keypad for inputting data and/or commands. The mobile computing device 208 can include other components for use with one or more applications such as a stylus, a touch-sensitive screen, keys (e.g., input keys, preset and programmable hot keys), buttons (e.g., action buttons, a multidirectional navigation button, preset and programmable shortcut buttons), switches, a microphone, speakers, an audio headset, a camera, and so forth. Through the interface, the users can interact with the mobile computing device 208.

In some example operating conditions, the mobile computing device 208 operates within a mobile environment 210, such as a passenger cabin of a vehicle. The mobile computing device 208 can be in communication with a mobile computing device interface 240. The mobile computing device interface 240 can be, for example, a wireless interface (using WIFI, BLUETOOTH®, or ZIGBEE protocols, for example) or a wired interface (using a USB protocol, for example). Generally, the mobile computing device interface 240 allows data communication between the mobile computing device 208 and various components of the mobile environment 210 via an onboard vehicle network. Example components include, without limitation, a speaker 242, an audio compression engine 244, microphone 246, and a graphical display 248. In some embodiments, content presented on a display screen of the mobile computing device 208 can be transmitted to the graphical display 248 of the mobile environment 210. The graphical display 248, can be, for example a component of a vehicle "infotainment" system, a heads up display, or other type of display viewable by a user in the mobile environment 210.

In general, the voice interface system 200 can provide a user in the mobile environment 210 with natural language voice activated operation of the mobile computing device 208 that is based on the user preferences. As a result, a personalized experience is provided to a user interacting with the system. An example operation of the voice interface system 200 illustrated in FIG. 2 will now be described in more detail. The mobile computing device 208 can execute an application that generally establishes a communication channel between the mobile computing device 208 and the voice interface system 200. By way of the mobile computing device interface 240, graphical content received by the mobile computing device 208 can be displayed on the graphical display 248. Once the mobile computing device 208 is in communication with both the mobile computing device interface 240 and the voice interface system 200, the user can utilize the system by speaking a request in natural language sentence format.

A human utterance 212 is received by a microphone 246 that is positioned within the mobile environment. The microphone 246 provides the audio to an audio compression engine 244, such as a compression engine offered by SPEEX, OPUS, or others. The compressed audio is passed to the mobile computing device 208, such as using a near field communications (NFC), or other data transmission technique. Upon receipt of the audio data, the mobile computing device 208 transmits the information to the voice interface system 200. The voice interface system 200 then obtains text transcription of the voice data using any suitable speech recognition technology (e.g., Dragon Naturally Speaking®, Siri®, and the like). In the illustrated embodiment, the audio data is provided to the speech recognition module 204 via an API and text data is returned. The text data can then be passed to a local or remote natural language processing module 202. The natural language processing module 202 determines an intention of the human utterance 212, as found in the text based data. Based on the intention, one or more commands (referred to herein as a command set), which, if executed by the voice interface system 200, would satisfy the intention expressed in the human utterance 212, are then supplied to the voice interface system 200. Next, based on the command set received from the natural language processing module 202, the voice interface system 200 determines if any user settings 218 are relevant to the command set.

By way of example, if the human utterance 212 is "are there any restaurants nearby I would like?", the natural language processing module 202 could issue commands such as "generate list of restaurants within a 5 mile radius" and "cross-reference list to preferred restaurants in user settings." The voice interface system 200 would then retrieve a list of restaurants within a 5 mile radius, such as through communications with online searching tools available through at least one third party application 214. Then, the voice interface system 200 compares the list of nearby restaurants with the names of restaurants provided by the user in the user settings 218. If there is a match, the voice interface system 200 generates a text string, such as "there is a Panera Bread Co. one mile away, would you like to go there?" and provides it to a text-to-speech module 232. Upon receiving the associated audio, it is transmitted to the mobile computing device 208 in the mobile environment 210. The associated audio is passed to the speaker 242 in the mobile environment 210 by way of the mobile computing device interface 240. In some embodiments, a map, or other relevant information, can also be displayed on the mobile computing device 208 and the graphical display 248. Upon hearing the question, the user can answer the question presented by the voice interface system 200. The answer, which is shown as a human utterance 212 in FIG. 2, is then provided to the voice interface system 200 and, in turn, to the natural language processing module 202 for processing. The natural language processing module 202 can determine, for example, that the user does want to eat at the suggested restaurant. As such, the natural language processing module 202 can dispatch the appropriate commands to the voice interface system 200, such as to provide route guidance to the selected restaurant. The route guidance can then be transmitted to the mobile computing device 208 to be displayed on the graphical display 248.

Figure 3:
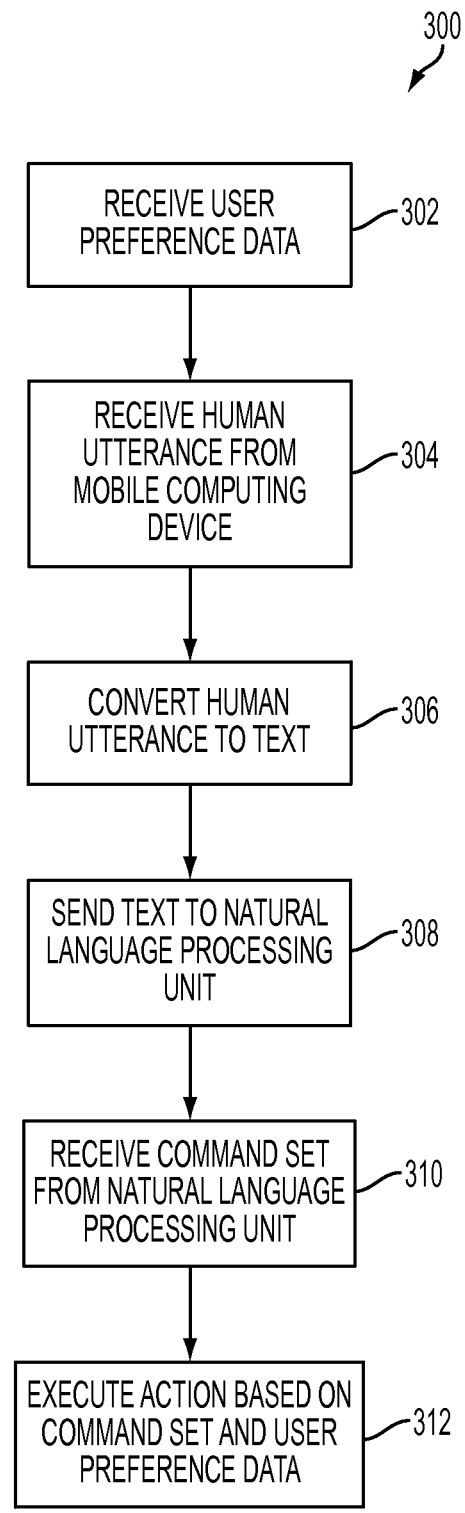
FIG. 3 depicts an example process flow utilizing a voice interface system.

FIG. 3 depicts an example process flow 300 utilizing a voice interface system, as described herein. At 302, user preference data is received. In some embodiments, the user preference data is received from a computing device 216 (FIG. 2) and stored in a database, such as database 228 (FIG. 2). User preference data can include any type of information that may be used by a voice interface system to provide a user with a personalized user experience. At 304, a human utterance is received from a mobile computing device. The human utterance can be in the form of audio data, such as a compressed audio waveform. The human utterance can be received from the mobile computing device over a suitable communications network, such as a cellular or WIFI network, among others.

At 306, the human utterance is converted to text. In some embodiments, a speech recognition module can be used to translate the spoken words of the human utterance into text. The text can then be sent to a natural language processing unit at 308. The natural language processing unit can generally implement natural language understanding (NLU) functionality to interpret the text to glean the intention of the user expressed in the human utterance that was received at 304. Based on the intention expressed in the human utterance, a command set can be identified by the natural language processing unit. At 310, the command set is received from the natural language processing unit. The command set can include one or more commands that can be executed to perform processing based on the intention expressed in the human utterance. At 312, an action is executed based on the command set and the user preference data received at 302. Accordingly, since the particular action that is executed is based on the user preference data, the user of the voice interface system can be provided with a personalized user experience.

Figure 4:
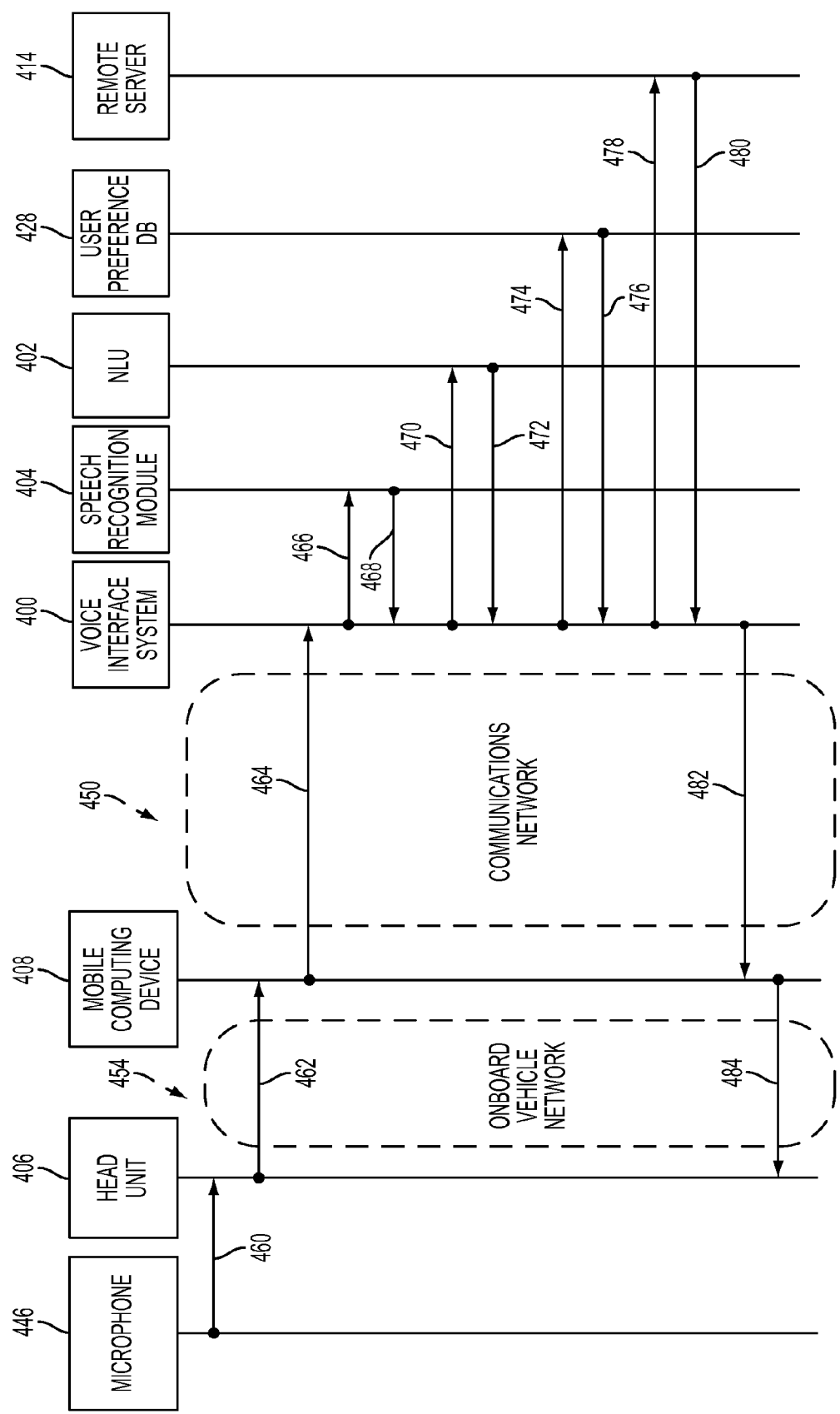
FIG. 4 depicts an example message sequence chart for an example voice-controlled system.

FIG. 4 depicts an example message sequence chart for an example voice-controlled system. As illustrated, the voice-controlled system can comprise a microphone 446 that is in communication with a head unit 406. The microphone 446 and head unit 406 can be components of a vehicle. The head unit 406 can include a graphical display, along with associated hardware and software. A mobile computing device 408 can be in communication with the head unit 406 through an onboard vehicle network 454. In some embodiments, for example, the mobile computing device 408 can communicate with the head unit 406 via a BLUETOOTH® protocol. The mobile computing device 408 can be in communication with a voice interface system 400 via a communications network 450. In some embodiments, the voice interface system 400 can generally be considered a "cloud-based" service, as the mobile computing device 408 can offload voice-based processing to the voice interface system 400 through network communications. Similar to the embodiment illustrated in FIG. 2, the voice interface system 400 can communicate with various entities, modules, and the like, such as a speech recognition module 404, a natural language processing unit 402, a user preference database 428, and a remote server 414.

During an example operation of the voice interface system 400, the microphone 446 transmits a message 460 to the head unit 406 that includes a human utterance as audio data. The head unit 406 can compress the audio data and transmit the compressed audio data to the mobile computing device 408 with a message 462. The message 462 can be transmitted through the onboard vehicle network 454. The mobile computing device 408 can then transmit a message 464 to the voice interface system 400 through a communications network 450. Upon receipt of the audio data contained in the message 464, the voice interface system 400 sends a message 466 to the speech recognition containing the audio data. It is noted that message 466, along with other messages in the message sequence chart can use any suitable message format known in the art, such as XML, JSON, and so forth. In any event, the speech recognition module 404 converts the audio data to text data and returns the text data to the voice interface system 400 in a message 468. The voice interface system 400 the sends a message 470 containing the text data to the natural language processing unit 402. The natural language processing unit 402 determines an intention expressed in the text based data and provides a command set 472 to the voice interface system 400. Based on the command set, the voice interface system 400 queries the user preference database 428 using message 474. A return message 476 from the user preference database 428 can include preferences associated with the command set. If no preferences are available, in some embodiments, default values are used by the voice interface system 400 to execute the command set. In any event, once the preferences of the user have been obtained, a message 478 is sent to the remote server 414 to execute the command. The remote server 414 responds with a message 480, which can be provided to the mobile computing device 408 by the voice interface system 400 via a message 482. Upon receiving the message 482, the mobile computing device 408 can provide the message 484 to the head unit 406 by way of the onboard vehicle network 454. The head unit 406 then displays information on a graphical display that is associated with the original human utterance that was originally received by the microphone 446.

In general, it will be apparent to one of ordinary skill in the art that at least some of the embodiments described herein can be implemented in many different embodiments of software, firmware, and/or hardware. The software and firmware code can be executed by a processor or any other similar computing device. The software code or specialized control hardware that can be used to implement embodiments is not limiting. For example, embodiments described herein can be implemented in computer software using any suitable computer software language type, such as, for example, conventional or object-oriented techniques. Such software can be stored on any type of suitable computer-readable medium or media, such as, for example, a magnetic or optical storage medium. The operation and behavior of the embodiments can be described without specific reference to specific software code or specialized hardware components. The absence of such specific references is feasible, because it is clearly understood that artisans of ordinary skill would be able to design software and control hardware to implement the embodiments based on the present description with no more than reasonable effort and without undue experimentation.

Moreover, the processes described herein can be executed by programmable equipment, such as computers or computer systems and/or processors. Software that can cause programmable equipment to execute processes can be stored in any storage device, such as, for example, a computer system (nonvolatile) memory, an optical disk, magnetic tape, or magnetic disk. Furthermore, at least some of the processes can be programmed when the computer system is manufactured or stored on various types of computer-readable media.

It can also be appreciated that certain portions of the processes described herein can be performed using instructions stored on a computer-readable medium or media that direct a computer system to perform the process steps. A computer-readable medium can include, for example, memory devices such as diskettes, compact discs (CDs), digital versatile discs (DVDs), optical disk drives, or hard disk drives. A computer-readable medium can also include memory storage that is physical, virtual, permanent, temporary, semipermanent, and/or semitemporary.

A "computer," "computer system," "host," "server," or "processor" can be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein can include memory for storing certain software modules used in obtaining, processing, and communicating information. It can be appreciated that such memory can be internal or external with respect to operation of the disclosed embodiments. The memory can also include any means for storing software, including a hard disk, an optical disk, floppy disk, ROM (read only memory), RAM (random access memory), PROM (programmable ROM), EEPROM (electrically erasable PROM) and/or other computer-readable media. Non-transitory computer-readable media, as used herein, comprises all computer-readable media except for transitory, propagating signals.

In various embodiments disclosed herein, a single component can be replaced by multiple components and multiple components can be replaced by a single component to perform a given function or functions. Except where such substitution would not be operative, such substitution is within the intended scope of the embodiments. The computer systems can comprise one or more processors in communication with memory (e.g., RAM or ROM) via one or more data buses. The data buses can carry electrical signals between the processor(s) and the memory. The processor and the memory can comprise electrical circuits that conduct electrical current. Charge states of various components of the circuits, such as solid state transistors of the processor(s) and/or memory circuit(s), can change during operation of the circuits.

Some of the figures can include a flow diagram. Although such figures can include a particular logic flow, it can be appreciated that the logic flow merely provides an exemplary implementation of the general functionality. Further, the logic flow does not necessarily have to be executed in the order presented unless otherwise indicated. In addition, the logic flow can be implemented by a hardware element, a software element executed by a computer, a firmware element embedded in hardware, or any combination thereof.

The foregoing description of embodiments and examples has been presented for purposes of illustration and description. It is not intended to be exhaustive or limiting to the forms described. Numerous modifications are possible in light of the above teachings. Some of those modifications have been discussed, and others will be understood by those skilled in the art. The embodiments were chosen and described in order to best illustrate principles of various embodiments as are suited to particular uses contemplated. The scope is, of course, not limited to the examples set forth herein, but can be employed in any number of applications and equivalent devices by those of ordinary skill in the art. Rather it is hereby intended the scope of the invention to be defined by the claims appended hereto.

What is claimed is:

1. A voice-controlled system, comprising:
 a user preference database configured to store user preference data; and
 a voice interface computing system in communication with the user preference database and a mobile computing device, wherein the voice interface computing system is in communication with the mobile computing device via a wireless communications network, wherein the mobile computing device is in networked communication with a vehicle via a mobile computing device interface of the vehicle, the voice interface computing system configured to:
  receive audio data from the mobile computing device via the wireless communications network, wherein the audio data comprises a human utterance received through the mobile computing device from the mobile computing device interface of the vehicle;
  transmit the audio data to a speech recognition module;
  receive text data from the speech recognition module;
  transmit the text data to a natural language processing module;
  receive a command set from the natural language processing module; and
  execute a command based on the command set and the user preference data stored in the user preference database, wherein executing the command comprises communicating with a remote application and communicating with the mobile computing device via the wireless communications network.

2. The voice-controlled system of claim 1, wherein the voice interface computing system is configured to receive the user preference data from a user computing device.

3. The voice-controlled system of claim 2, wherein the user computing device is the mobile computing device.

4. The voice-controlled system of claim 3, wherein the command set is based on a determined intention of the human utterance.

5. The voice-controlled system of claim 1, wherein the user preference data identifies any one or more of a user dining preference, a user navigation preference, and a user destination preference.

6. The voice-controlled system of claim 5, wherein the voice interface computing system is configured to generate a portal to receive at least one of the user dining preference, the user navigation preference, and the user destination preference.

7. The voice-controlled system of claim 1, wherein the voice interface computing system is configured to determine whether the user preference data is associated with the command set:
 based on the command set received from the natural language processing module, such that:
 when the user preference data is associated with the command set, execute the command based on the associated user preference data; and
 when the user preference data is not associated with the command set, execute the command based on default data.

8. A method, comprising:
 receiving, by a computing system, user preference data;
 receiving, by the computing system from a mobile computing device over a wireless communications network, audio data, wherein the mobile computing device is in networked communication with a vehicle via a mobile computing device interface of the vehicle, and wherein the audio data comprises a human utterance received by the mobile computing device through the mobile computing device interface of the vehicle;
 transmitting, by the computing system, the audio data to a speech recognition module to obtain text data associated with the audio data;
 transmitting, by the computing system, the text data to a natural language processing unit;
 receiving, by the computing system, a command set from the natural language processing unit; and
 executing a command based on the command set and the user preference data, wherein executing the command comprises communicating with a remote application and communicating with the mobile computing device interface via the wireless communications network.

9. The method of claim 8, wherein the audio data received by the computing system is captured by a microphone configured to be coupled to a vehicle.

10. The method of claim 9, wherein when the audio data is received from the mobile computing device, the mobile computing device is positioned within a passenger cabin of the vehicle.

11. The method of claim 8, wherein the command set is based on a determined intention of the human utterance.

12. The method of claim 8, wherein the user preference data identifies one or more of a user dining preference, a user navigation preference, and a user destination preference.

13. A system, comprising:
 a user preference database configured to store user preference data;
 a voice interface computing system in communication with the user preference database and a mobile computing device, and wherein the voice interface computing system is in communication with the mobile computing device via a wireless communications network, wherein the mobile computing device is in networked communication with a vehicle via a mobile computing device interface of the vehicle, the voice interface computing system configured to:
  receive audio data from the mobile computing device, wherein the audio data comprises a natural language human utterance of a passenger of the vehicle, and wherein the audio data is received over any of a cellular communications network and a WIFI communications network;
  communicate with a natural language processing module that is configured to transmit a command set to the voice interface computing system based on the intention of the human utterance;

execute a command based on the command set and the user preference data stored in the user preference database; and cause the display of information to the passenger of the vehicle via the mobile computing device.

14. The system of claim 13, wherein the voice interface computing system is configured to transmit the audio data to a speech recognition module and receive text data from the speech recognition module.

15. The system of claim 14, wherein the voice interface computing system is configured to transmit the text data to the natural language processing module.

16. The system of claim 13, comprising an application server configured to receive communications from an application executing on the mobile computing device.

17. The system of claim 13, comprising a web server configured to receive communications from a web browser executing on the mobile computing device.

18. The system of claim 13, wherein the user preference data comprises user preference data supplied by the passenger of the vehicle.

19. The system of claim 18, wherein the voice interface computing system is configured to retrieve user preference data from the mobile computing device.

20. The system of claim 19, wherein the voice interface computing system is configured to retrieve calendar appointment data from the mobile computing device.

* * * * *